(12) United States Patent
Jarvis et al.

(10) Patent No.: US 9,131,135 B2
(45) Date of Patent: Sep. 8, 2015

(54) ELECTRONIC DEVICE FLASH SHUTTER

(75) Inventors: Daniel W. Jarvis, Sunnyvale, CA (US); Richard P. Howarth, San Francisco, CA (US); David Tupman, San Francisco, CA (US); Richard H. Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1138 days.

(21) Appl. No.: 12/481,558

(22) Filed: Jun. 9, 2009

(65) Prior Publication Data

US 2010/0309369 A1 Dec. 9, 2010

(51) Int. Cl.
*H04N 5/225* (2006.01)

(52) U.S. Cl.
CPC ........... *H04N 5/2254* (2013.01); *H04N 5/2256* (2013.01); *H04N 5/2257* (2013.01)

(58) Field of Classification Search
USPC .......................................... 348/371, 367–368
See application file for complete search history.

(56) References Cited

U.S. PATENT DOCUMENTS

| | | | |
|---|---|---|---|
| 3,757,654 A | 9/1973 | Mori | |
| 4,946,256 A * | 8/1990 | Woodruff | 359/230 |
| 5,652,922 A * | 7/1997 | Kohno | 396/72 |
| 6,046,836 A * | 4/2000 | Tuchman | 359/230 |
| 6,517,213 B1 * | 2/2003 | Fujita et al. | 362/84 |
| 6,625,399 B1 | 9/2003 | Davis | |
| 7,683,967 B2 * | 3/2010 | Kawakami | 348/371 |
| 2004/0004671 A1 * | 1/2004 | Takahashi | 348/375 |
| 2005/0243071 A1 * | 11/2005 | Kent et al. | 345/177 |
| 2006/0158653 A1 * | 7/2006 | Chiarello et al. | 356/445 |
| 2007/0075514 A1 * | 4/2007 | Saiki | 280/124.103 |
| 2007/0110433 A1 * | 5/2007 | Masahiko | 396/469 |
| 2008/0062683 A1 * | 3/2008 | Belliveau et al. | 362/231 |
| 2008/0080850 A1 * | 4/2008 | Amirzadeh et al. | 396/155 |
| 2009/0263119 A1 * | 10/2009 | Lim et al. | 396/493 |
| 2010/0048257 A1 * | 2/2010 | Prest et al. | 455/575.1 |

FOREIGN PATENT DOCUMENTS

GB 2 118 314 10/1983

OTHER PUBLICATIONS

"Heptagon—The Photon Delivery Company—Flash", [online], [retrieved May 7, 2009], <URL: http://www.heptagon.fi/index.php?page=flash>.

\* cited by examiner

*Primary Examiner* — Roberto Velez
*Assistant Examiner* — Yih-Sien Kao
(74) *Attorney, Agent, or Firm* — Treyz Law Group; G. Victor Treyz; Kendall P. Woodruff (57) ABSTRACT

An electronic device may have a camera module for acquiring still and video digital images of a subject. A light source such as a light-emitting diode may serve as a flash for the camera module. A shutter may be mounted above the light-emitting diode. When the light-emitting diode is not being used to produce a flash of light for illuminating the subject, the shutter may be closed to block the light-emitting diode from view by a user. During image acquisition operations in which it is desired to illuminate the subject, the shutter may be opened to allow light from the light-emitting diode to exit the electronic device. The electronic device may have a touch screen display with an active region and an inactive region. The camera module and light source may be mounted under a portion of the inactive region of the display. The shutter may include a filter structure.

7 Claims, 10 Drawing Sheets

10 – Electronic Device
12 – Housing
14 – Bezel
16 – Ports
18 - Button
20 – Display
22 – Inactive regions of display
24 – Region
26 – Active region of display

FIG. 1

10 – Electronic Device
12 – Housing
14 – Bezel
20 – Display
22 – Inactive regions of display
24 – Region
26 – Active region of display
28 – Transparent cover
30 – Touch sensor array
32 – Ink
34 – Transparent region
36 – Control circuitry
38 – Path
40 – Light source
42 – Path
44 – Actuator
46 – Shutter
48 – Filter structure
64 – Module

40 – Light source
50 – Blade
52 – Cover member
54 - Opening
56 – Flex circuit
56A – Planar flex circuit portion
58 – Connector
60 - Axis
64 – Module
66 – Portion of light source
68 – Core structure
70 – Coil
71A and 71B – Positive and negative leads
72 – Base member
73A and 73B – Pads
74 – Magnet
76 – Optical lens
78 – Cover member
80 – Circular opening
82 – Spring structure
84 – Cylindrical opening
86 – Rectangular opening
88 – Post
90 – Portion of shutter blade

40 – Light source
50 – Blade
52 – Cover member
54 - Opening
56 – Flex circuit
72 – Base member
76 – Optical lens
78 – Cover member
92 – Camera module
94 – Lens ring
100 – Cavity

FIG. 6

52 – Cover member
54 - Opening
56 – Flex circuit
64 – Module
92 – Camera module
94 – Lens ring
56 – Flex circuit
58 – Connector
102 – Portion of lens ring

ELECTRONIC DEVICE FLASH SHUTTER

BACKGROUND

This invention relates generally to electronic devices, and more particularly, to shutters for electronic devices.

Digital cameras use digital image sensors to capture images. Electronic devices such as computers and cellular telephone are also sometimes provided with digital image sensors. For example, a laptop computer may have a digital image sensor mounted in its display housing to allow a user to participate in a video conference. A cellular telephone might have a rear-mounted or front-mounted digital camera sensor to allow a user of the cellular telephone to capture images.

Photography in low-light conditions often benefits from the use of artificial illumination. Many electronic devices are therefore provided with flash capabilities. For example, digital cameras and cellular telephones are sometimes provided with xenon flashtubes. Xenon flashtubes are able to provide ample illumination when acquiring images at low ambient light levels, but tend to be bulky and visually unappealing.

To address some of the size and aesthetic issues associated with conventional xenon flashbulbs, camera flash units have been developed that use light emitting diodes (LEDs). Flash devices that are based on LED technology tend to be small in size and exhibit reduced power consumption, but can be unsightly.

It would therefore be desirable to be able to provide improved illumination equipment for electronic devices with digital camera sensors.

SUMMARY

An electronic device such a computer or cellular telephone may be provided with a camera module. The camera module may have a camera sensor. When it is desired to take a photograph or capture video, the camera sensor may be used to acquire digital image data.

It is sometimes desirable to illuminate a subject when acquiring digital images. For example, in low-light conditions it may be helpful to project a flash of light onto the subject as a digital image is captured.

A light source such as a light-emitting diode may serve as a source of illumination. The light source may be mounted within the electronic device under an inactive portion of a touch screen display. The camera module may be mounted adjacent to the light source. This type of configuration may allow components from the camera module and the light source to be mounted on a common substrate. For example, the camera module and the light source may both be mounted on the same flex circuit.

A shutter may be used to conceal the light source when not in use. The shutter may have a movable shutter blade. An actuator may be used to position the movable shutter blade in an open position or a closed position as appropriate.

Control circuitry may be coupled to the camera module to receive digital images. The control circuitry may also be coupled to the shutter and the light source. When it is desired to use the light source as a camera flash, the control circuitry may place the shutter in the open position. This exposes the light source and allows light from the light source to pass through the shutter to exit the electronic device. When flash operations are complete, the control circuitry may place the shutter in a closed position to block the light source from view.

The shutter may have a rotating magnet that is mounted on a post in a base member. The base member may have an opening that receives the light source. The base member and other structures associated with the light source and shutter may be formed from heat-resistant materials to avoid heat damage when operating the light source.

The shutter may have a shutter blade that is formed from a thin layer of silicon. Upper and lower shutter blade cover members may be used to create an interior opening into which the shutter blade may be retracted when the shutter is open.

If desired, the shutter blade may be provided with a transparent colored filter structure. For example, an opening in a silicon shutter blade may be filled with a red or green transparent material (as an example). When the shutter blade is in its closed position, light from the light source may pass through the filter structure for viewing by a user of the electronic device. Status information or other suitable information may be conveyed to the user by controlling the light source. For example, the light source may be turned on and off while the shutter blade is closed to create a blinking status light during the acquisition of video with the camera module.

Further features of the invention, its nature and various advantages will be more apparent from the accompanying drawings and the following detailed description of the preferred embodiments.

DETAILED DESCRIPTION

Shutters may be used to cover light sources such as light-emitting diode (LED) light sources in electronic devices. The electronic devices may be provided with camera sensors for acquiring digital images. The light sources may be used to provide illumination when acquiring the digital images. For example, the light sources may serve as flashes that provide relatively bright illumination for short periods of time.

When a light source is in active use, its shutter may be opened to allow light to be emitted. When the light source is not being used, its associated shutter may be closed. This may improve the appearance of the device by shielding a potentially unsightly light emitting diode from view. For example, a blue light-emitting diode may have a yellow filter layer so that its emitted light is white. The yellow color of the exterior portion of this type of light-emitting diode helps to ensure that light-emitting diode emits light with a desired color temperature, but may be unsightly. This unsightly appearance may be exacerbated when the light source is provided with an efficient beam shaping lens. By using the shutter as a cosmetic cover, the yellow color of the light-emitting diode is blocked from view.

Light sources with shutters may be used in any suitable electronic device. As an example, these light sources may be used in electronic devices such as desktop computers or computer monitors. The electronic devices in which the light sources are used may also be portable electronic devices such as laptop computers, tablet computers, or small portable computers of the type that are sometimes referred to as ultraportables. If desired, portable electronic devices with shuttered light sources may be somewhat smaller devices. Examples of smaller portable electronic devices that may use light sources with shutters include wrist-watch devices, pendant devices, headphone and earpiece devices, and other wearable and miniature devices. With one suitable arrangement, the portable electronic devices may be handheld electronic devices.

Figure 1:
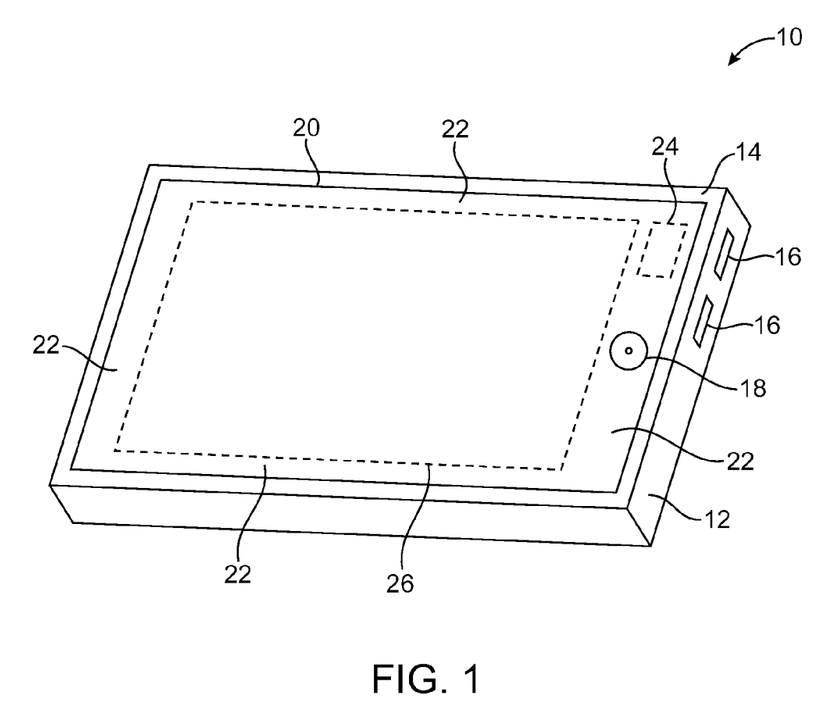
FIG. 1 is a perspective view of an illustrative electronic device in accordance with an embodiment of the present invention.

An illustrative electronic device in accordance with an embodiment of the present invention is shown in FIG. 1. Device 10 of FIG. 1 may be, for example, an electronic device that supports wireless functions. Device 10 may have storage and processing circuitry that allows device 10 to run code. The code may be used in implementing functions such as internet browsing functions, email and calendar functions, games, music player functionality, digital image acquisition functions, flash and shutter control operations, indicator light functions, etc.

Device 10 may have housing 12. Housing 12 may be formed of any suitable materials including, plastic, glass, ceramics, metal, other suitable materials, or a combination of these materials. Bezel 14 may serve to hold a display such as display 20 or other device with a planar surface in place on device 10.

Display 20 may be a liquid crystal display (LCD), an organic light emitting diode (OLED) display, or any other suitable display. The outermost surface of display 20 may be formed from one or more plastic or glass layers. If desired, touch screen functionality may be integrated into display 20 or may be provided using a separate touch pad device. An advantage of integrating a touch screen into display 20 to make display 20 touch sensitive is that this type of arrangement can save space and reduce visual clutter.

Display screen 20 (e.g., a touch screen) is merely one example of an input-output device that may be used with electronic device 10. If desired, electronic device 10 may have other input-output devices. For example, electronic device 10 may have user input control devices such as button 18 and input-output components such as ports 16. Button 18 may be, for example, a menu button. Ports 16 may include audio jacks, universal serial bus ports, and other digital and analog input-output connectors. Openings in housing 12 may, if desired, form speaker and microphone ports. In the example of FIG. 1, display screen 20 is shown as being mounted on the front face of handheld electronic device 10, but display screen 20 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 18 and touch screen 20. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown as being formed on the top face of electronic device 10 in the example of FIG. 1, buttons such as button 18 and other user input interface devices may generally be formed on any suitable portion of electronic device 10. For example, a button such as button 18 or other user interface control may be formed on the side of electronic device 10. Buttons and other user interface controls can also be located on the top face, rear face, or other portion of device 10.

Display 20 may be covered with a transparent plastic or glass cover. This cover, which is sometimes referred to as the display "cover glass" may extend over the exposed surface of device 10, as shown in FIG. 1. Central region 26 of display 20 may be provided with touch-screen functionality. Touch screen functionality may be provided using resistive touch sensors, acoustic-based touch sensors, capacitive touch sensors, or any other suitable touch sensor arrangement. For example, transparent touch screen electrodes for a capacitive touch sensor may be provided on the underside of the cover glass in central region 26.

Because region 26 is sensitive to touch input (e.g., when a user's finger or other external objects are detected within a particular proximity of the touch sensor), region 26 is sometimes referred to as the active region. Portions of display 20 outside of active region 26 (e.g., peripheral regions 22 in the example of FIG. 1) do not contain touch sensor electrodes and may therefore sometimes be referred to as inactive regions. The undersides of the cover glass of display 20 in inactive regions 22 may be coated with an opaque ink (e.g., black ink) to hide components under regions 22 from view.

Camera sensors and light sources such as light-emitting-diode light sources may be mounted in any suitable portion of electronic device 10. For example, a camera sensor and light-emitting diode may be mounted on the rear of device 10 or on a side portion of device 10. With one suitable arrangement, which is sometimes described herein as an example, a camera sensor and associated light-emitting diode light source are mounted under an inactive region 22 of the display cover glass such as region 24 of FIG. 1. This is, however, merely one illustrative location for locating a camera sensor and light source in device 10. Any location may be used to mount a camera sensor and light source if desired.

Figure 2:
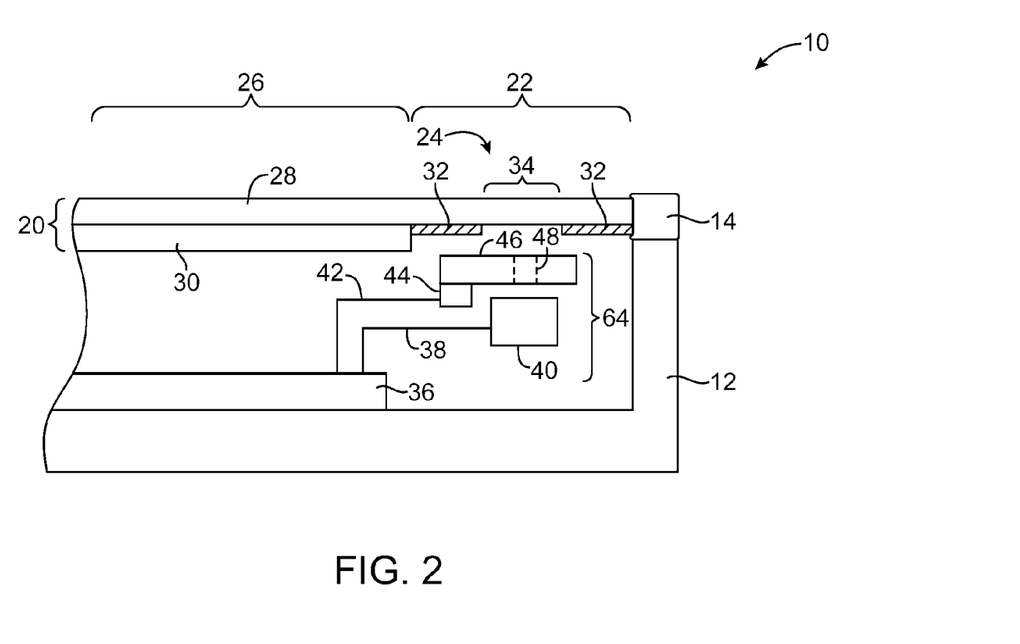
FIG. 2 is a cross-sectional side view of an illustrative electronic in accordance with an embodiment of the present invention.

A cross-sectional side view of an illustrative electronic device such as electronic device 10 of FIG. 1 is shown in FIG. 2. As shown in FIG. 2, display 20 may include a transparent cover 28. Cover 28 may be a planar member that is formed from plastic, glass, or other transparent material. Display 20 may be mounted to housing 12 of device 10 using bezel 14. If desired, an elastomeric gasket may be used to help prevent damage to the edges of cover 28.

In active region 26, display 20 may be provided with an array of touch sensor electrodes such as touch sensor array 30.

A light source such as light source 40 may be mounted in region 24 of inactive region 22. Light source 40 may be a light-emitting diode, an array of light-emitting diode structures, a flashlamp, or any other suitable source of light. Portions of the underside of cover 28 in region 22 may be coated with an opaque material such as black ink 32. The opaque material shields interior components in device 10 from view. In region 34, there is no black ink, so that cover 28 remains transparent.

Because region 34 is transparent, shutter 46 may be used to help shield the interior of device 10 from view when light source 40 is not being used to provide illumination for digital image capture functions. Shutter 46 may have one or more opaque blades. With one suitable arrangement, which is sometimes described herein as an example, shutter 46 may have a single silicon blade. An actuator such as electromagnetic actuator 44 may be used to move the shutter blade between an open position and a closed position.

Control circuitry 36 may be coupled to shutter actuator 44 and light source 40 by paths 42 and 38, respectively. Paths 42 and 38 may include one or more conductive lines and may be used to transmit control signals to shutter 44 and light source 40.

When it is desired to use light source 40 to provide light (e.g., for illuminating image capture operations with a digital camera sensor), control circuitry 36 may provide control signals to actuator 44 over path 42 that direct actuator 44 to place the blade of shutter 46 in its open position.

While the blade of shutter 46 is open, control circuitry 36 may provide control signals to light source 40 over path 38 that direct light source 40 to generate illumination. As an example, control circuitry 36 may direct light source 40 to generate a high intensity burst of light (i.e., a "flash" for taking a digital photograph). Steady illumination may also be provided. For example, light source 40 may be used to generate continuous illumination at a potentially lower light level when it is desired to illuminate a subject while acquiring video. Continuous light may also be generated to provide illumination for red-eye reduction functions or may be generated to provide illumination during autofocus operations.

When the flash event or other illumination event is complete, control circuitry 36 may provide control signals to light source 40 that place light source 40 in an appropriate low-power state. Control circuitry 36 may also provide control signals to shutter 46 that close the shutter blade. With the shutter blade closed, the user's view of light source 40 will be blocked, thereby enhancing device aesthetics.

If desired, the blade of shutter 46 may be provided with one or more filter structures such as filter structure 48. A filter structure may be formed in a circular or rectangular opening within the blade or the entire blade may be used to form a filter structure. Each filter structure may, for example, include a colored transparent material such as a green or red plastic or dyed epoxy. These materials may appear essentially opaque when light source 40 is turned off, but may permit transmission of light from light source 40 when light source 40 is turned on. This allows the filter structure to be used as a status indicator light.

Consider, as an example, a situation in which shutter 46 is in its closed position. When in its closed position, filter structure 48 can be positioned over light source 40, as shown in FIG. 2. In this configuration, control circuitry 36 may turn on light source 40 without opening shutter 46. When turning on light source 40 in this way, control circuitry 36 may set the output intensity of light source 40 to its maximum permitted value or may reduce the output level somewhat to conserve power and reduce the amount of heat generated by light source 40. With light source 40 turned on and shutter 46 in its closed position, light from light source 40 may pass through filter structure 48 and transparent region 34.

Control circuitry 36 can control the pattern of light that is emitted and the intensity of light that is emitted through filter structure 48 to convey information to the user of device 10. The information that is conveyed may be, for example, information on the state of device 10. Examples of information that may be conveyed by using light source 40 and filter structure 48 as a status indicator light include information on whether video capture functions are active or inactive (i.e., a "privacy" indicator), information on whether a battery in device 10 is being charged by a power adapter or other power information (i.e., a "charge status" or "battery" indicator), countdown timer information (e.g., just before a picture is captured using an automatic timed shutter function), information on autofocus status, information on low ambient light status, other camera information, information related to non-camera operations such as cellular telephone operations or media player operations, etc.

If desired, the components of shutter 46 and light source 40 may be interconnected to form a module such as module 64. Module 64 may optionally include a camera sensor (i.e., to form an integrated shutter, light source, and camera module).

Figure 3:
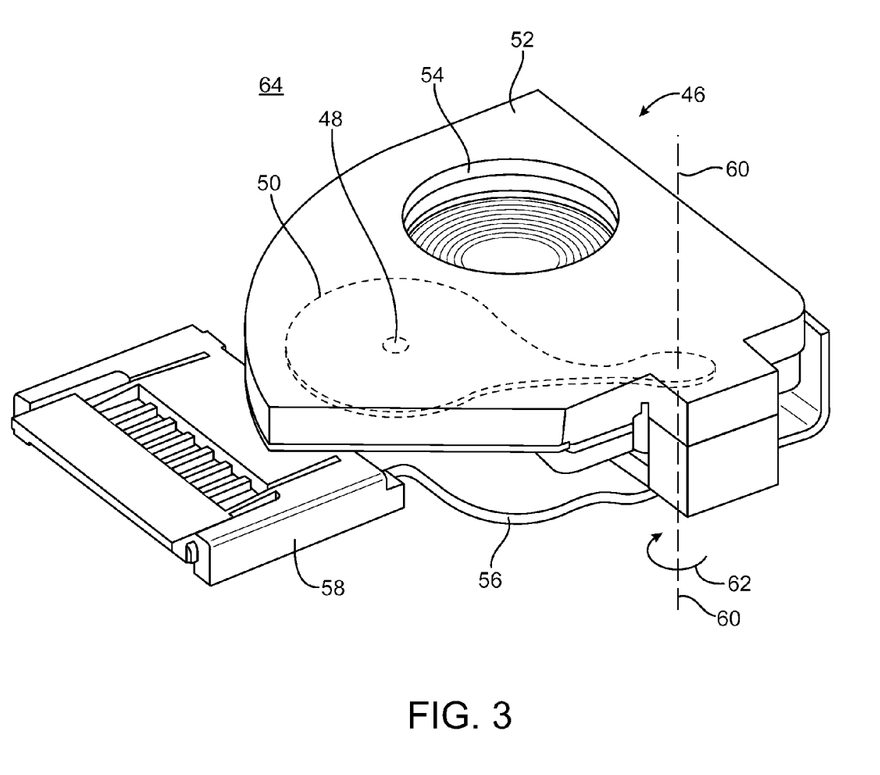
FIG. 3 is a perspective view of an illustrative shutter that may be used to conceal a light source such as a light emitting diode in accordance with the present invention.

A perspective view of an illustrative module 64 of the type that may be used in electronic device 10 is shown in FIG. 3. As shown in FIG. 3, module 64 may have a cover member such as shutter cover member 52 for covering the upper portion of shutter 46. Light source 40 (FIG. 2) may be mounted beneath opening 54 in cover member 52. Because light source 40 may emit heat during operation, it may be desirable to form cover member 52 and other portions of module 64 from heat resistant materials. An illustrative heat resistant material that may be used for cover member 52 and other portions of module 64 is polyetherimide. Other heat resistant materials that may be used include ceramics, glass, metal alloys, and silicon (as examples).

When installed in device 10, opening 54 in shutter cover member 52 may be aligned with opening 34 in black ink layer 32 in cover glass 28 of display 20 (FIG. 2). Shutter 46 may have a shutter blade such as blade 50 (shown as having an optional filter structure 48). In FIG. 3, shutter blade 50 is shown in its open position (not covering opening 54). When it is desired to close shutter 46, shutter blade 50 may be rotated in direction 62 about rotational axis 60 by actuator 44 (FIG. 2).

The components of shutter 46 and module 64 may be mounted to a substrate such as a printed circuit board substrate. This allows control signals to be provided to the actuator and light source of module 64. The substrate may be, for example, a rigid printed circuit board substrate such as a fiberglass-filed epoxy circuit board or may be a flexible printed circuit board. Flexible printed circuit boards, which are sometimes referred to as flex circuits, have conductive traces formed on flexible sheets such as flexible sheets of polyimide or other polymers. In the example of FIG. 3, the components of module 64 have been mounted on flex circuit 56. Flex circuit 56 may include conductive traces for forming paths such as paths 42 and 38 of FIG. 2. A connector such as zero-insertion-force (ZIF) connector 58 may be used to connect the traces of flex circuit 56 to control circuitry 36 (FIG. 2).

Figure 4:
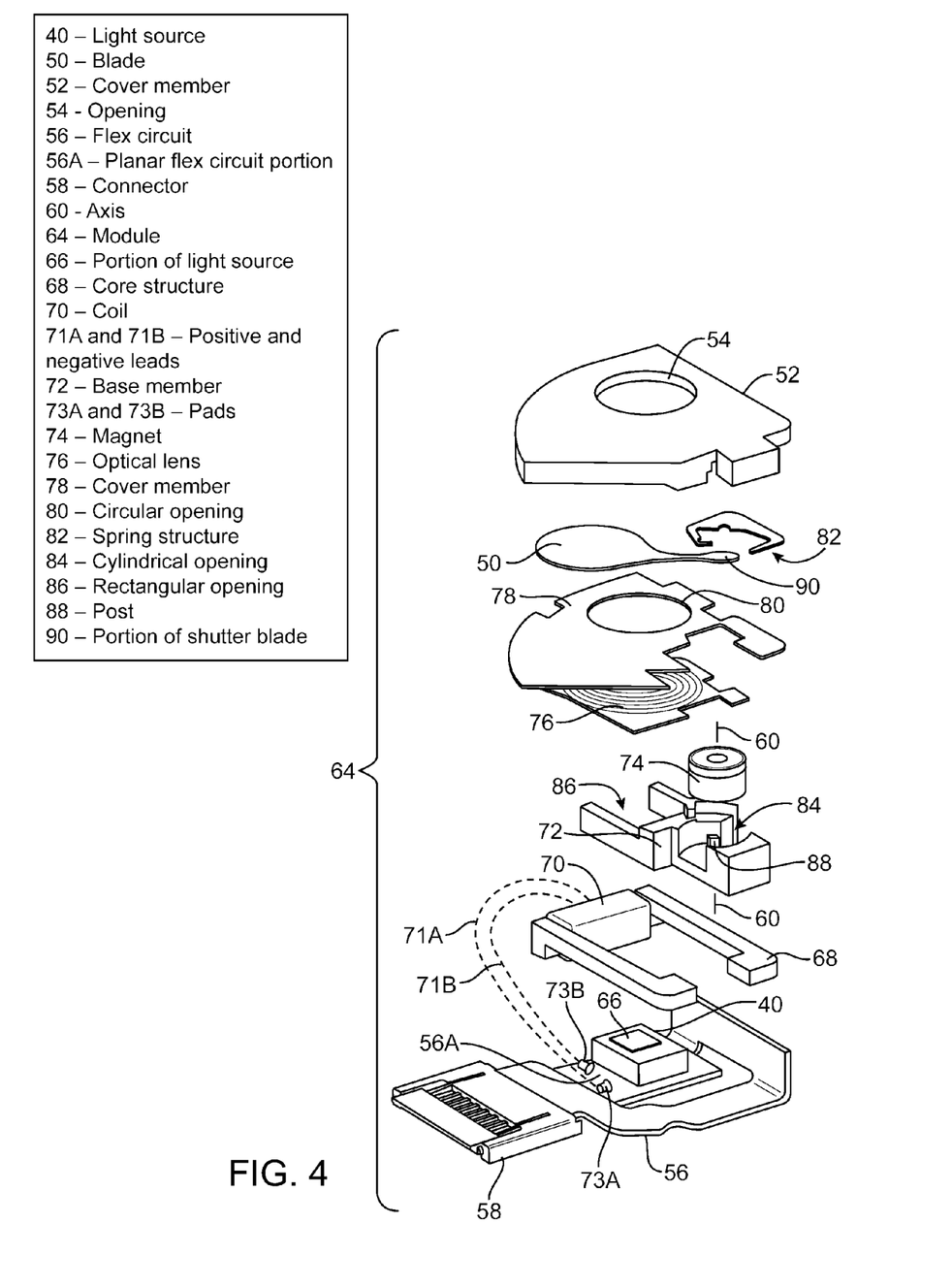
FIG. 4 is an exploded perspective view of an illustrative light-emitting-diode flash assembly in which a shutter is used to conceal the light-emitting diode when not in use in accordance with an embodiment of the present invention.

An exploded perspective view of a module such as module 64 of FIG. 3 is shown in FIG. 4.

As shown in FIG. 4, light source 40 of module 64 may be mounted on a planar portion of flex circuit 56 such as planar flex circuit portion 56A. Flex circuit 56 may be, for example, a two-layer flex circuit. Connector 58 may be, for example, a six-pin zero-insertion-force connector.

During operation, light may be emitted through portion 66 of light source 40. Light source 40 may be a light-emitting diode and portion 66 may include a color correction filter that adjusts the color spectrum of the emitted light (e.g., to ensure that otherwise bluish light appears sufficiently white).

Module 64 may have structures that form electromagnetic actuator 44 of FIG. 2. These structures may include permanent magnet 74 and an electromagnet formed from coil 70 and core structure 68. Electromagnetic coil 70 may be formed from wire that is wrapped around core structure 68. Core structure 68 may have a U-shape as shown in FIG. 4 and may be formed from a ferrous material such as steel. Positive and negative leads 71A and 71B of electromagnetic coil 70 may be electrically connected to respective pads 73A and 73B on planar portion 56A on flex circuit 56. When current is passed through the wire of coil 70, a magnetic field is produced that causes magnet 74 to rotate around axis 60. If desired, actuator 44 may be formed from a moving electromagnet and a stationary permanent magnet or may be formed from stationary and moving electromagnets. The example of FIG. 4 in which the moving actuator member is formed from a permanent magnet (magnet 74) and the stationary structures are formed from an electromagnet (coil 70 on core 68) is merely illustrative.

Blade 50 may be attached to magnet 74. Magnet 74 may have a cylindrical axial opening that allows magnet 74 to be mounted on post 88 in cylindrical opening 84 in base member 72. When mounted on post 88, magnet 74 (and therefore the attached shutter blade 50) may rotate about rotational axis 60.

Base member 72 may be formed from polyetherimide, other plastics, or other suitable materials. When assembled inside device 10, light-emitting diode 40 may be received in rectangular opening 86 of base member 72. Because light source 40 may produce heat during operation, the use of heat resistant materials such as polyetherimide when forming base member 72 can help prevent heat-induced damage to base member 72.

It may be desirable to shape the beam of light that is emitted from light source 40. In the example of FIG. 4, module 64 includes an optical lens 76 that helps to redirect emitted light into a desired beam shape. Lens 76 may be a single element lens, a multi-element lens, a thin film lens (e.g., a Fresnel lens) or any other suitable lens. As an example, lens 76 may be a Fresnel-type lens having a transparent substrate on which a pattern of concentric rings are formed by curing transparent epoxy (e.g., by ultraviolet light curing). The substrate may be formed from a planar plastic film such as a sheet of polycarbonate or polyetherimide.

Lens 76 may be mounted under lower shutter blade cover member 78 using adhesive or other suitable fastening mechanisms. When mounted to member 78, the rings of lens 76 may be aligned with circular opening 80. Cover member 78 may be formed from plastic, metal, or other suitable materials. For example, cover member 78 may be formed from a non-ferrous metal such as beryllium copper. An advantage of using a non-ferrous material for cover member 78 is that this helps avoid creating electromagnetic interference with the actuator. An advantage of using metal for cover member 78 is that metals can be formed with small thicknesses (e.g., 0.5 mm or less, 0.2 mm or less, etc.). Using a thin shape for cover member 78 helps to make module 64 compact.

Shutter blade 50 may be formed from a thin material such as metal, plastic, semiconductor, etc. With one suitable arrangement, which is sometimes described herein as an example, shutter blade 50 is formed from a thin layer of silicon (e.g., a layer that is less than about 0.1 mm thick, less than 0.05 mm thick, etc.). Silicon structures such as blade 50 can be formed using semiconductor manufacturing techniques. Structures such as these are often referred to as microelectromechanical systems (MEMS) structures, so blade 50 may sometimes be referred to as a MEMS shutter blade. Portion 90 of shutter blade 50 may be attached to magnet 74 using adhesive.

Blade 50 may have a spring structure 82 that is attached to top cover member 52. Spring 82 may help provide a restoring force for shutter blade 50. Any suitable structure may be used in forming a shutter blade spring mechanism (e.g., silicon, a magnet that imparts a restoring force, a spring metal member, etc.). The use of spring 82 is merely illustrative.

Upper shutter blade cover 52 may be connected to lower shutter blade cover 78 using any suitable attachment mechanism. For example, adhesive may be provided in peripheral regions of the upper surface of member 78 to bond the underside of member 52 to the upper surface of member 78 and thereby capture spring 82 and shutter blade 50 in module 64.

Figure 5:
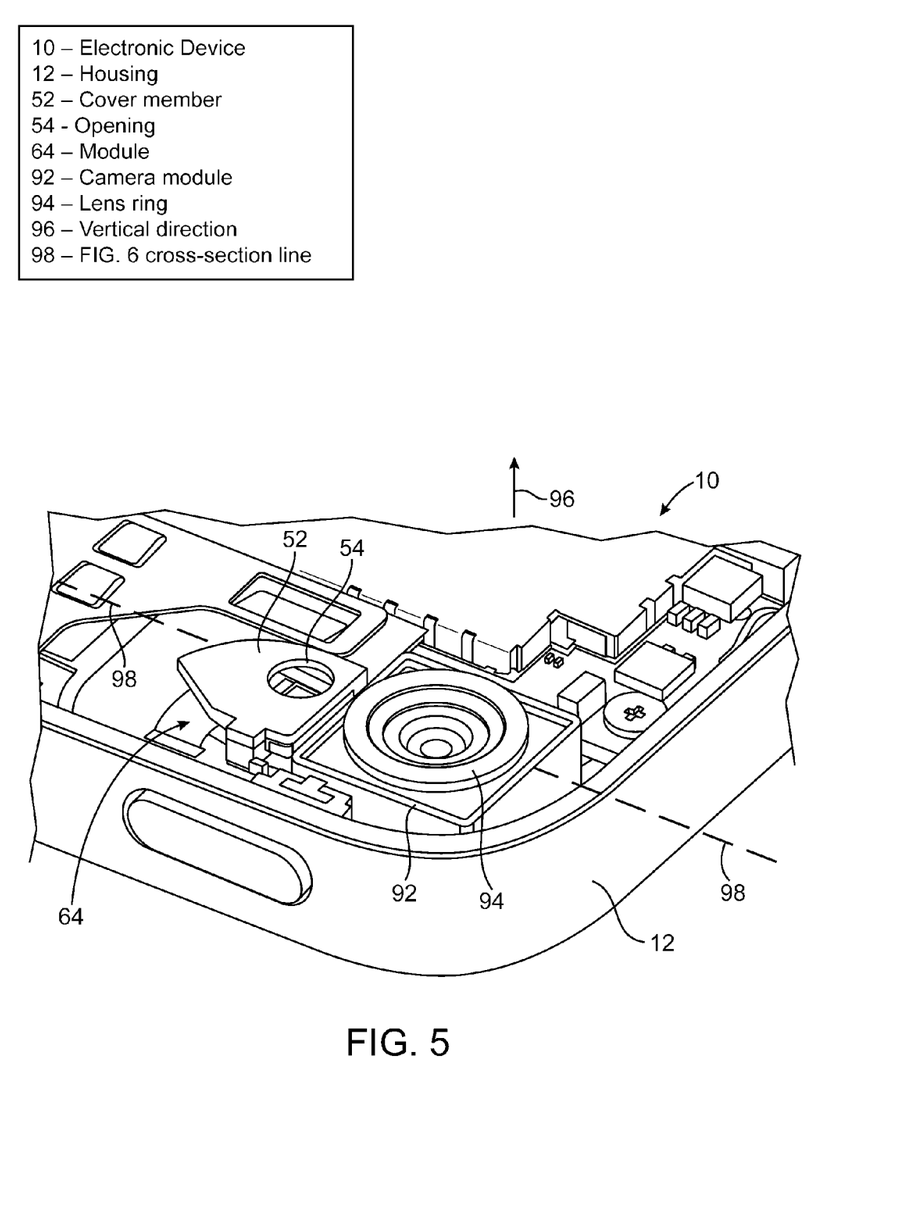
FIG. 5 is a perspective view of an interior portion of an illustrative electronic device showing how the device may have a flash assembly with a shutter that is mounted adjacent to a digital camera in accordance with an embodiment of the present invention.

When using light source 40 as a camera flash or other source of illumination for still and video imaging applications, it may be desirable to mount module 64 adjacent to a camera sensor. This type of arrangement is shown in FIG. 5. In the example of FIG. 5, module 64 has been mounted in a corner region of housing 12 (e.g., in a region that will be under an inactive portion of the display when the display is mounted in device 10). Camera module 92 may be mounted adjacent to light-source and shutter module 64. When mounted in device 10, lens ring 94 and the associated lens of camera module 92 face in the same direction (vertical direction 96) as opening 54 in shutter cover member 52.

Figure 6:
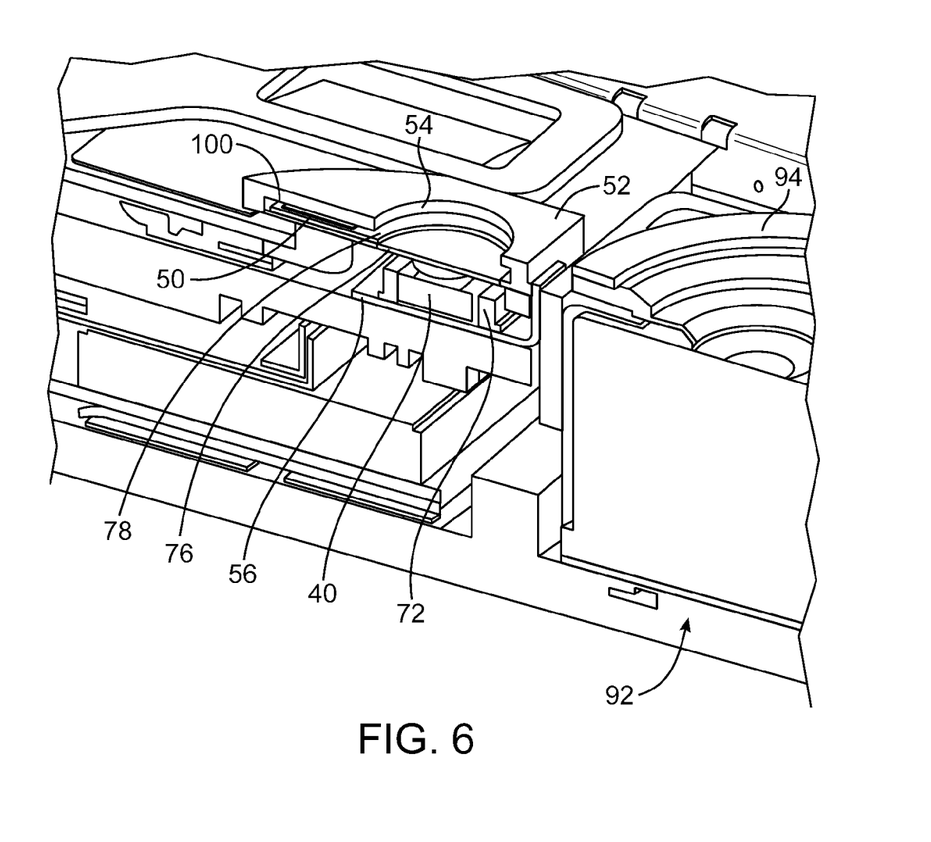
FIG. 6 is a cross-sectional perspective view of a flash assembly with a shutter and an adjacent digital camera in accordance with an embodiment of the present invention.

FIG. 6 is a perspective view of device 10 that has been cut in cross-section along line 98 of FIG. 5. As shown in FIG. 6, light source 40 may be mounted within base 72 in alignment with lens 76 and hole 54 in member 52.

When upper shutter cover member 52 is attached to lower shutter cover member 78, a thin cavity 100 is formed into which shutter blade 50 may be retracted when the shutter is in its open position. There is preferably sufficient clearance between shutter blade 50 and the adjoining surfaces of members 52 and 78 to avoid undesirable attractive forces between blade 50 and member 52 and 78 (e.g., electrostatic forces or Van der Waals forces).

Figure 7:
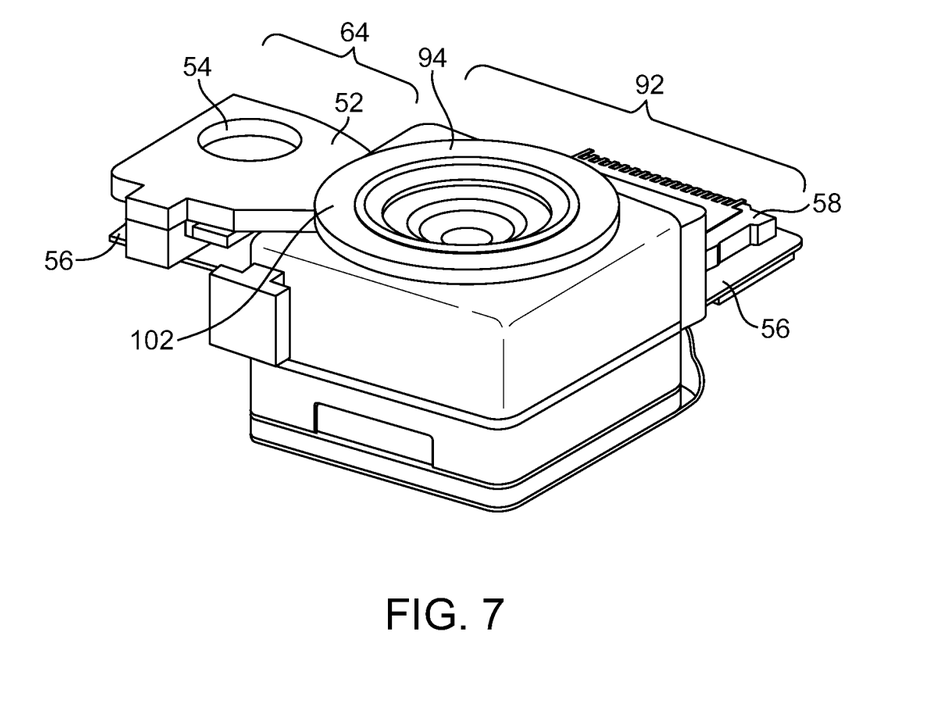
FIG. 7 is a perspective view of a module with an integrated flash and camera in accordance with an embodiment of the present invention.

If desired, shutter and light source module 64 may be integrated with camera module 92. This type of arrangement is shown in FIG. 7. As shown in FIG. 7, a compact configuration may be created in which a portion of upper cover member 52 protrudes under portion 102 of camera trim ring 94. FIG. 7 also shows how the components of both camera module 92 and module 64 may be mounted on a common flex circuit substrate (flex circuit 56), thereby facilitating additional size reductions.

Figure 8:
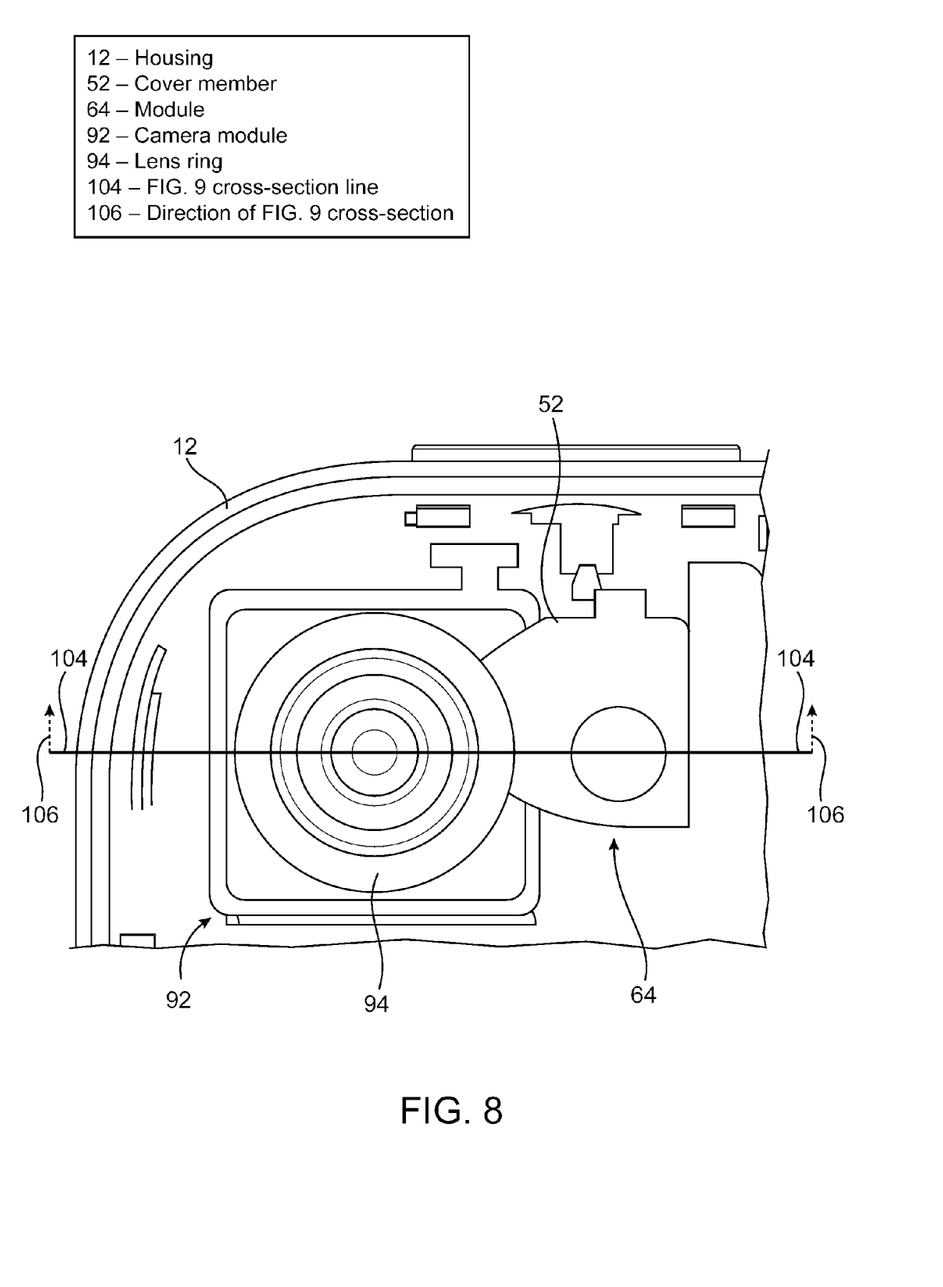
FIG. 8 is a top view of an interior portion of an illustrative electronic device having a module with an integrated flash and camera in accordance with an embodiment of the present invention.

FIG. 8 is a top view of an integrated assembly of the type shown in FIG. 7.

Figure 9:
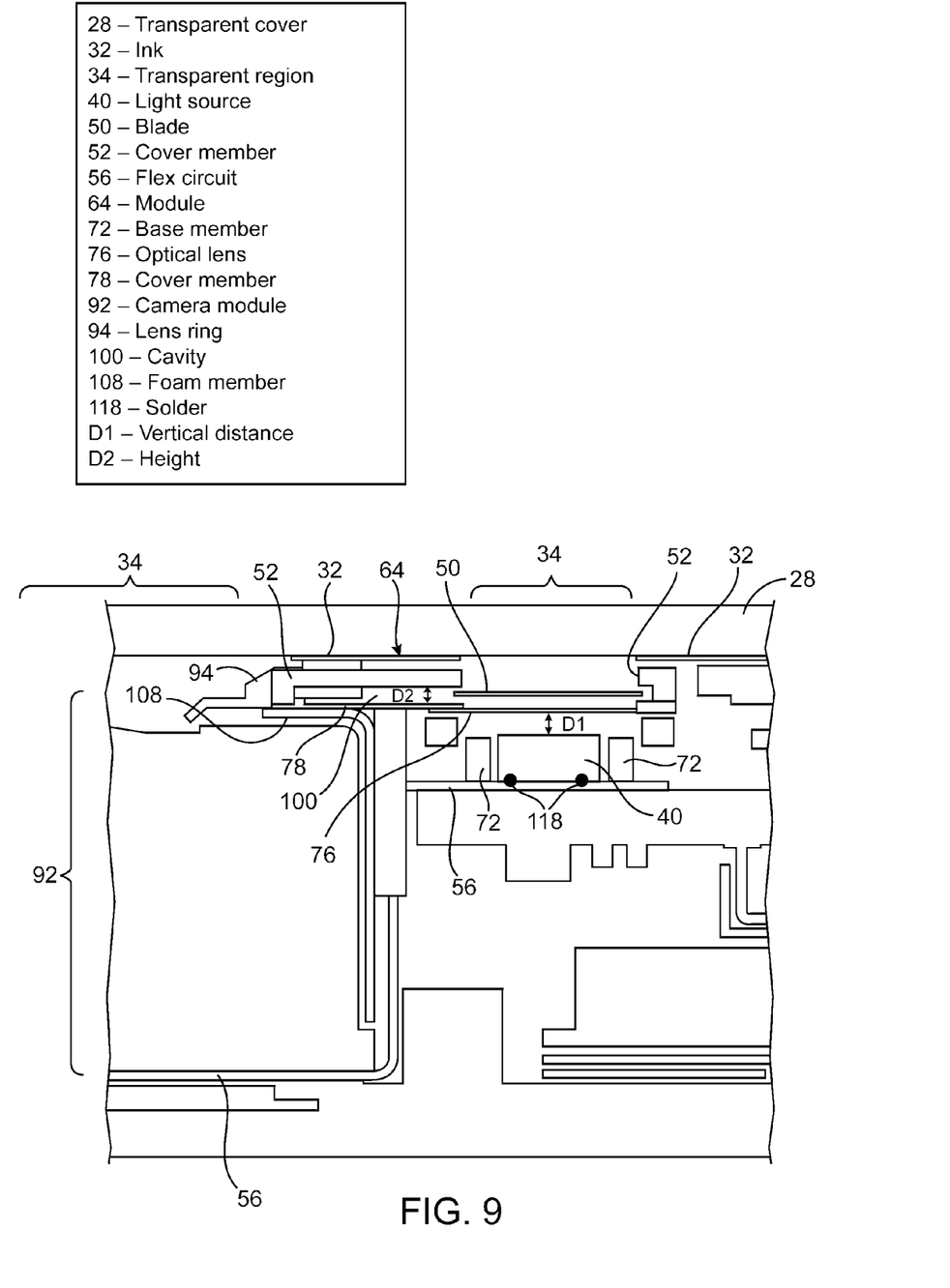
FIG. 9 is a cross-sectional side view of a module of the type shown in FIG. 8.

FIG. 9 is a cross-sectional side view of the integrated assembly of FIG. 8 taken along line 104 in direction 106. As shown in FIG. 9, the components of camera module 92 and the components of module 64 such as the actuator and light source may be mounted to a common flex circuit 56. Light source 40 may be a surface mount device (SMD) that is soldered to flex circuit 56 using solder 118.

There may be a clearance (vertical distance D1) between the upper surface of light source 40 and the lower surface of lens 76 that serves as an optical gap and allows light from source 40 to spread before being collected and shaped into a desired beam shape by lens 76. Shutter blade cavity 100 may have a height D2. Blade 50 may be located at approximately the midpoint of cavity 100, so that there is a clearance of D2/2 between blade 50 and the lower surface of member 52 and a clearance of D2/2 between blade 50 and the upper surface of member 78. Because lens 76 is mounted to the lower surface of member 78 (in the illustrative embodiment of FIG. 9), there is a clearance of at least D2/2 between blade 50 and lens 76.

Ink 32 may cover the components of module 64 and module 92 from view through cover glass 28. Regions 34 of cover glass 28 may be free of ink 32 to avoid blocking light source 40 and the camera sensor of module 92.

Foam member 108 may be used to form a dust seal that prevents foreign matter from intruding into the interior of device 10.

Figure 10:
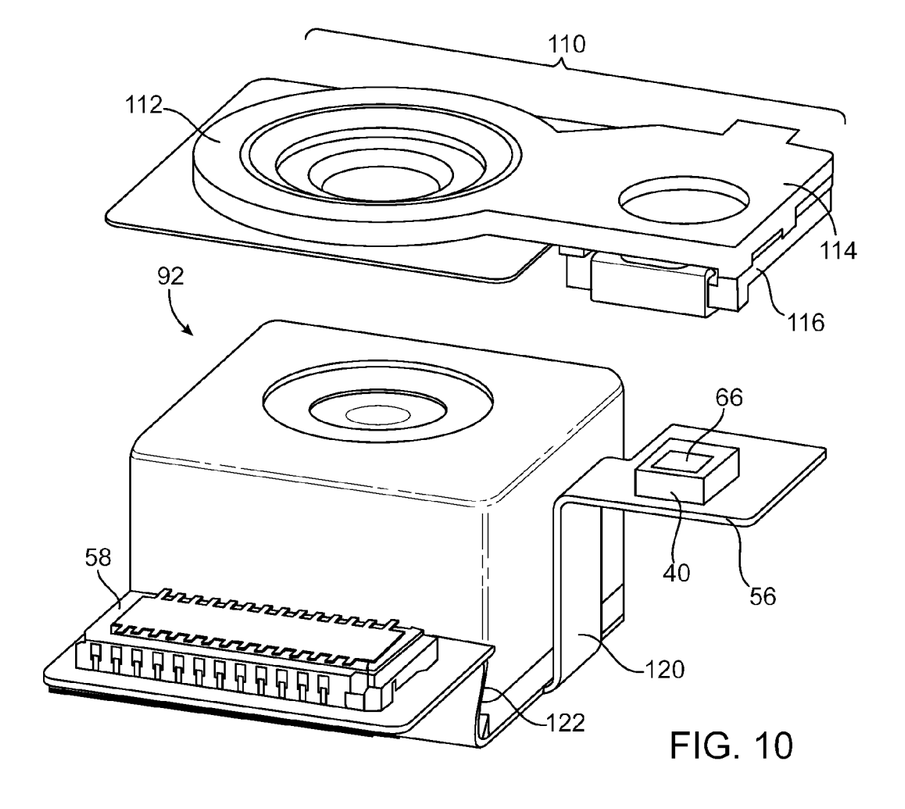
FIG. 10 is an exploded perspective view of an illustrative module with an integrated flash and camera in which the flash shutter and camera are provided with an integrated shutter cover in accordance with an embodiment of the present invention.

As shown in the illustrative configuration of FIGS. 7, 8, and 9, lens trim ring 94 and shutter cover member 52 may be formed as separate parts that are joined during assembly. If desired, the lens trim ring and shutter cover may be formed as an integral member. This type of arrangement is shown in FIG. 10. As shown in FIG. 10, member 110 may include a portion such as portion 112 that serves as a camera trim ring for camera module 92 and has a portion such as portion 114 that serves as a cover for shutter components 116 and light source 40.

In configurations such as the configuration of FIG. 10 in which a unitary flex circuit (flex circuit 56) is used for mounting module 92, light source 40, and shutter components 116, connector 58 may include pins that convey digital camera sensor information associated with module 92, control signals for light source 40, and control signals for the shutter (shutter components 116 in FIG. 10). Flex circuit 56 is flexible, which allows the shape of flex circuit 56 to be configured to accommodate a variety of device environments. For example, flex circuit 56 may have a tails such as tail 120 and tail 122 that allow connector 58 and light source 40 to be placed at desired locations in device 10 relative to module 92.

If desired, other electronic components such as light sensors can be cosmetically covered with shutter 46. The use of shutter 46 to cover light source 40 is merely illustrative.

The foregoing is merely illustrative of the principles of this invention and various modifications can be made by those skilled in the art without departing from the scope and spirit of the invention.

What is claimed is:

1. A light source module in an electronic device that provides illumination for capturing digital images with the electronic device, comprising:
    a light source;
    a shutter blade for the light source;
    an upper shutter blade cover member;
    a lower shutter blade cover member, wherein the upper shutter blade cover member and the lower shutter blade cover member are contained within a housing of the electronic device and attached to each other to form a cavity in which the shutter blade moves between an open position and a closed position;
    an actuator that causes the shutter blade to open so that light from the light source passes beyond the shutter blade and exits the electronic device; and
    a camera module lens trim ring formed in the upper shutter blade cover member.

2. The light source module defined in claim 1 wherein the actuator further causes the shutter blade to close so the light source is hidden from view by the shutter blade.

3. The light source module defined in claim 2 wherein the shutter blade comprises a layer of silicon.

4. The light source module defined in claim 2 further comprising a magnet connected to the shutter blade.

5. The light source module defined in claim 4 further comprising an electromagnet that creates a magnetic field to move the magnet, wherein movement of the magnet moves the shutter blade between the open position and the closed position.

6. The light source module defined in claim 1 wherein the lower cover member comprises metal and the upper cover member comprises plastic.

7. The light source module defined in claim 1 wherein the light source comprises a light-emitting diode.

* * * * *